United States Patent
Mori (10) Patent No.: US 6,822,365 B2
(45) Date of Patent: Nov. 23, 2004

(54) SMALL BRUSH MOTOR (75) Inventor: Zendi Mori, Maruko-machi (JP)

(73) Assignees: Sanyo Seimitsu Co., Ltd., Chiisagata-gun (JP); Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/373,073

(22) Filed: Feb. 26, 2003

(65) Prior Publication Data

US 2003/0201690 A1 Oct. 30, 2003

(30) Foreign Application Priority Data

Apr. 30, 2002 (JP) ........................................ 2002-128285

(51) Int. Cl.[7] ........................ H02K 13/04; H02K 13/06; H02K 23/06; H02K 27/02
(52) U.S. Cl. ........................ 310/234; 310/198; 310/220
(58) Field of Search ................................ 310/233, 234, 310/198, 219–220, 268–269, 51, 40 MM; 29/596–598, 729–733

(56) References Cited

U.S. PATENT DOCUMENTS

| | | | | |
|---|---|---|---|---|
| 5,202,599 A | * | 4/1993 | Kao | 310/234 |
| 6,153,960 A | * | 11/2000 | Katagiri et al. | 310/269 |
| 6,170,146 B1 | * | 1/2001 | Katagiri et al. | 29/597 |
| 6,285,109 B1 | * | 9/2001 | Katagiri et al. | 310/269 |
| 6,396,175 B2 | * | 5/2002 | Fujita et al. | 310/51 |

FOREIGN PATENT DOCUMENTS

| | | | | |
|---|---|---|---|---|
| JP | 53-128706 | * | 11/1978 | 310/234 |
| JP | 03-270662 | * | 12/1991 | 310/234 |

* cited by examiner

*Primary Examiner*—Tran Nguyen
(74) *Attorney, Agent, or Firm*—Armstrong, Kratz, Quintos, Hanson & Brooks, LLP (57) ABSTRACT

A small brush motor which uses a three-electrode varistor and which suppresses disconnection or short-circuits of crossover wires of coils. Each phase coil of the three-phase coil of an armature uses three risers and two salient poles, each phase coil having a zigzag part formed by alternately bending and connecting successively to the front side, back side, and back side the three salient poles in the interval from the knotting part of the first riser in the forward rotation direction to the knotting part of the second riser, a first coil part formed by winding from the knotting part of the second riser in the reverse rotation direction and wrapping at the adjoining first salient pole, and a second coil part formed by winding from the first coil part in the forward rotation direction and wrapping at the adjoining second salient pole and connects to a knotting part of the adjoining opposite phase first riser extending from the second coil part in the forward rotation direction, the winding directions of the first and second coil parts being opposite each other.

3 Claims, 8 Drawing Sheets

SMALL BRUSH MOTOR

BACKGROUND OF THE INVENTION

1. Field of the Invention

The present invention relates to a small brush motor of a four-magnetic-pole-six-salient pole structure provided with a varistor for suppressing overvoltage, and more particularly, to the winding state of an armature coil winding.

2. Description of the Related Art

As seen in Japanese Unexamined Patent Publication (Kokai) No. 11-69747, U.S. Pat. No. 6,153,960, and U.S. Pat. No. 6,285,109, in small brush motors of four-magnetic-pole-six-salient pole structures, motors are being increased in flatness, reduced in size, reduced in cost, and reduced in wiring defects by using three-electrode ring varistors usually used for two-magnetic-pole-three-salient pole structures as varistors for suppressing overvoltage (extinguishing spark arcs). For this, it is necessary to electrically connect the opposed risers in a point symmetric positional relationship about the center of rotation of the armature core among the six risers (terminal parts of commutator pieces). For the purpose of improving the productivity, etc., instead of using special printed circuit boards for connecting the risers or using the known commonly applied art of individual wiring using conductors, they are connected by using partial segments of the coil wrapped around the six salient poles so as to achieve a continuous pattern including the six risers.

Figure 7A:
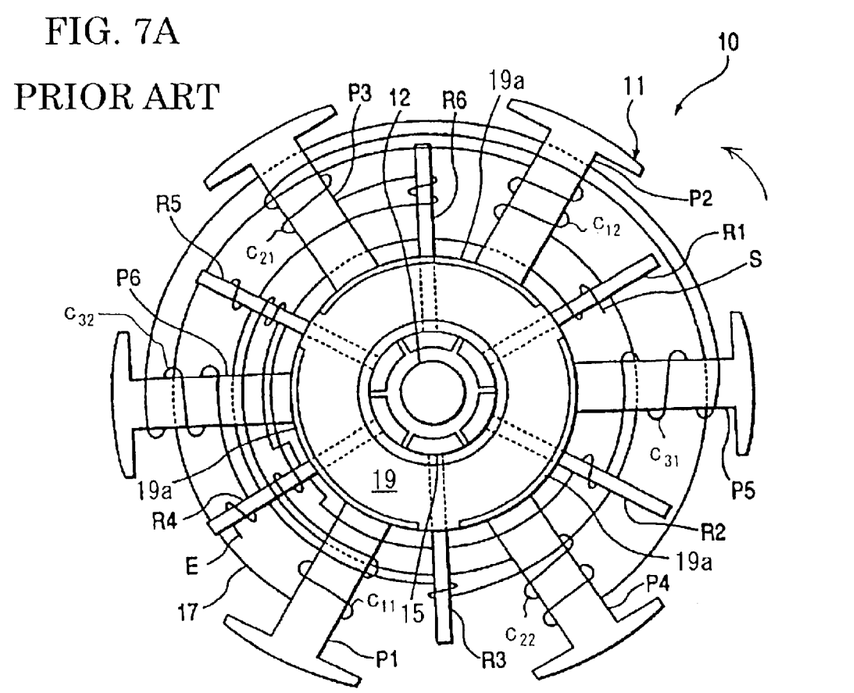
FIG. 7A is a schematic plan view of the winding state of the coil of an armature in a small brush motor of the related art and FIG. 7B is a wiring diagram of the coil.
Figure 7B:
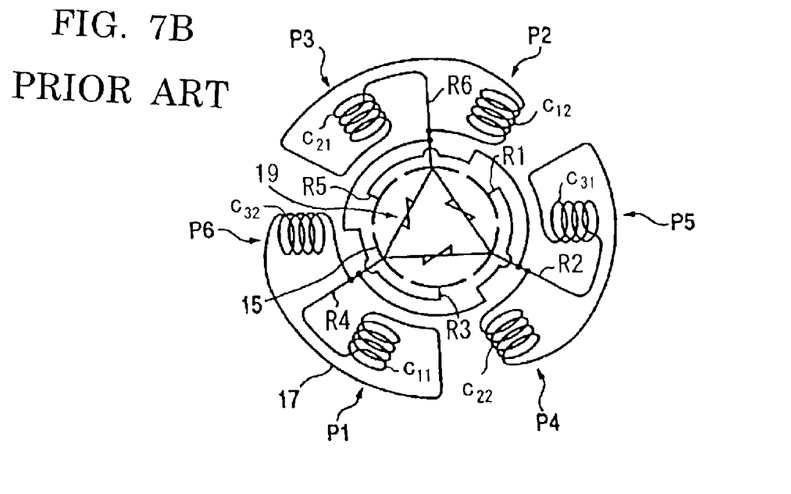

That is, the armature 10 of this small brush motor, as shown in FIGS. 7A and 7B, is provided with a shaft 12, an armature core 11 having six salient poles P1 to P6 in a radial array, a commutator 15 having six risers R1 to R6 positioned between the salient poles at one end face of the armature core 11, a three-phase coil 17 comprised of a single wire continuously wound around the six risers R1 to R6 and the six salient poles P1 to P6 in the form of a continuous pattern, a ring varistor 19 for suppressing overvoltage having three electrodes (19a, 19a, 19a) connected to every other one of the six risers R1 to R6, that is, three risers (R2, R4, and R6), and a brush (not shown) for sliding contact with the commutator 15. Further, this small motor is provided with a stator permanent magnet (not shown) having four magnetic poles.

Each phase coil of the three-phase coil 17 is obtained by winding the wire around a first riser (R1, R3, and R5) and a second riser (R2, R4, and R6) in a point symmetric positional relationship with respect to the center of rotation of the armature core 11, then winding around the first salient pole (P1, P3, and P5) adjoining the second riser, then winding around a second salient pole (P2, P4, and P6) in a point symmetric positional relationship with the first salient pole (P1, P3, and P5) about the center of rotation of the armature core 11. Each phase coil is attached using three risers and two salient poles.

Figure 8A:
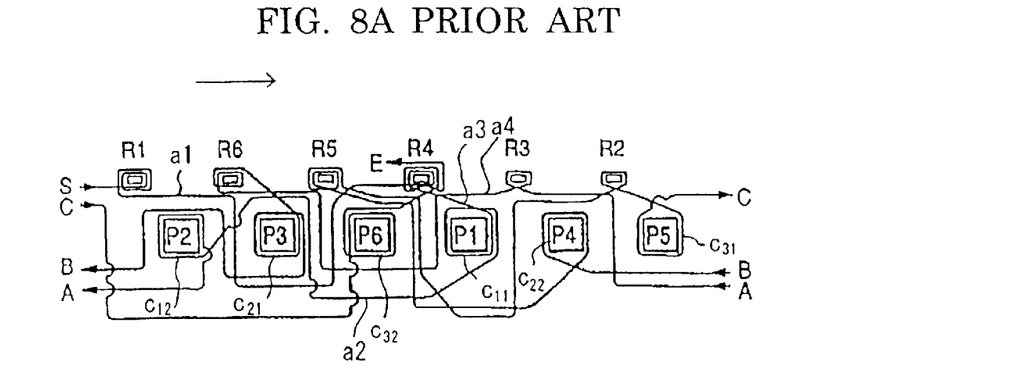
FIGS. 8A to 8C are diagrams of winding states of the coil shown in FIGS. 7A and 7B along the peripheral face of the armature core.
Figure 8B:
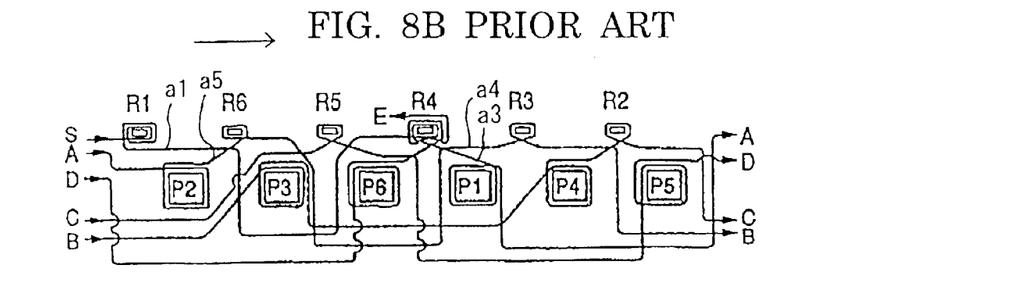
Figure 8C:
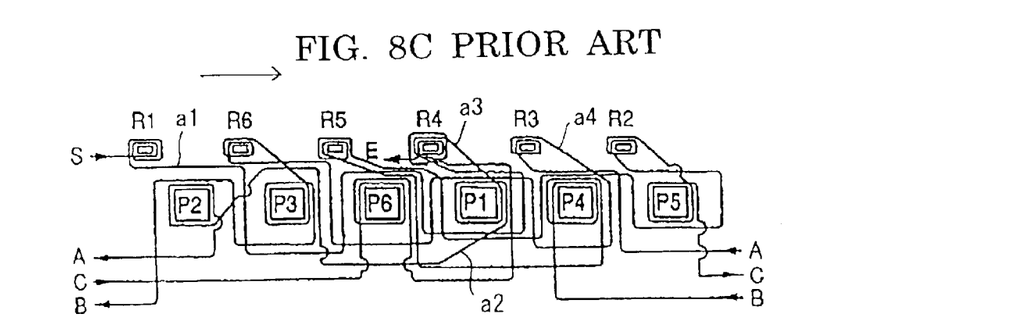

Here, as shown by spreading open the peripheral end of the armature core in FIG. 8A, a first phase coil is comprised by knotting a winding start S to the riser R1, winding the wire in the forward rotation direction (arrow direction), knotting it with the riser R4 opposed to the riser R1 in a point symmetric positional relationship about the center of rotation of the armature core 11, wrapping it around the adjoining salient pole P1 in the forward rotation direction as the first coil part $C_{11}$, then winding it in the reverse rotation direction and wrapping it around the salient pole P2 opposed to the salient pole P1 as the second coil part $C_{12}$, then winding it in the reverse direction rotation and knotting it with the adjoining riser R3 in the forward rotation direction of the salient pole P1. Next, the second coil is comprised by winding the wire in the reverse rotation direction from the riser R3, knotting it with the riser R6 opposed to the riser R3, wrapping it around the adjoining salient pole P3 in the forward rotation direction as the first coil part $C_{21}$, then winding it in the reverse rotation direction and wrapping it around the salient pole P4 opposed to the salient pole P3 as the second coil part $C_{22}$, then winding it in the reverse direction rotation and knotting it with the adjoining riser R5 in the forward rotation direction of the salient pole P3. Next, the third phase coil is comprised by winding the wire in the forward rotation direction from the riser R5, knotting it with the riser R2 opposed to the riser R5, wrapping it around the adjoining salient pole P5 as the first coil part $C_{31}$ in the forward rotation direction, then winding it in the forward rotation direction and wrapping it around salient pole P6 opposed to the salient pole P5 as the second coil part $C_{32}$, then knotting it with the adjoining riser R4 in the forward rotation direction as the winding end E. Here, if expressing the forward rotation direction by the arrow mark →, the reverse direction rotation by the arrow mark ⇒, and the length of the crossover wire between the salient poles, between the risers, and between a salient pole and a riser by rotational angle (radians) as a general measure and showing the winding order by simple symbols, the result becomes as follows:

Winding state shown in FIG. 8A:

$R1(S)(\pi) \to R4 \to (\pi/6) \to P1 \Rightarrow (\pi) \Rightarrow P2 \Rightarrow (\pi/3) \Rightarrow R3 \Rightarrow$
$(\pi) \Rightarrow \to (\pi/6) \to P3 \Rightarrow (\pi) \Rightarrow P4 \Rightarrow (\pi/3) \Rightarrow R5 \to (\pi) \to R2 \to (\pi/6) \to$
$P5 \to (\pi) \to P6 \to (\pi/6) \to R4(E)$ FIGS. 8B and 8C show other continuous patterns.

Winding state shown in FIG. 8B:

$R1(S) \to (\pi) \to R4 \to (\pi/6) \to P1 \to (\pi) \to P2 \to (\pi/6) \to R6 \to (\pi) \to R3 \to$
$(7\pi/6) \to P3 \to (\pi) \to P4 \to (\pi/6) \to R2 \to (\pi) \to R5 \to (7\pi/6) \to P5 \to$
$(\pi) \to P6 \to R4(E)$

Winding state shown in FIG. 8C:

$R1(S) \to (7\pi/6) \to P1 \Rightarrow (\pi/6) \Rightarrow R4 \to (\pi/6) \to P1 \Rightarrow (\pi) \Rightarrow$
$P2 \Rightarrow \Rightarrow (5\pi/6) \Rightarrow R3 \to (\pi/6) \to P4 \Rightarrow (7\pi/6) \Rightarrow R6 \to (\pi/6) \to P3 \Rightarrow$
$(\pi) \Rightarrow P4 \to (5\pi/6) \Rightarrow R5(E)$ Summarizing the problems to be solved by the present invention, even with the small brush motor of the above four-magnetic-pole-six-salient-pole structure, greater flatness, smaller size, and higher torque are being demanded. As a motor is made flatter and smaller, however, the coil area per salient pole also becomes smaller and increasing the torque becomes difficult. In general, there is a tradeoff between greater flatness and smaller size and higher torque. In general, along with greater flatness and smaller size, the coil has to be made finer, but with a single coil, if the number of turns is increased, the wire length will become longer, so the resistance loss (copper loss) will become greater. As a means for easing this to some extent, if winding a coil comprised of N (natural number) number of ultrafine wires arranged in parallel by a continuous pattern, at the coil part at each salient pole, as compared with winding a single ultrafine wire as the coil in a continuous pattern, the wires become denser and the coil area can be increased to a certain extent and also the copper loss can be suppressed using the surface film effect due to the relative increase in the surface area of the wires. Therefore, even with greater flatness and smaller size, the torque can be increased to a certain extent.

In general, however, when using ultrafine wire as the coil, the tensile strength becomes considerably weaker and disconnection easily occurs, so it is necessary to shorten the length of crossover wires between salient poles, between risers, and between risers and salient poles as much as possible. Further, when fixing wires conductively by soldering, etc., to the knotting parts of the risers R1 to R6, the heat of melting is conducted from the risers to the crossover wires, so it is necessary to eliminate cross points between crossover wires between different phase coils and prevent short-circuits between different phase coils due to destruction of the insulating films of the crossover wires. If there is a cross point of crossover wires near risers between coils having the same phase, while there is no problem even with point peeling of the insulating film at the time of manufacture, the conductive wires will abrade as a result of rubbing due to vibration or the thermal cycle while driving the motor, and disconnection accidents are liable to occur, so it is preferable that there are no cross points of the crossover wires near the risers.

The brush-type motor of the above four-magnetic-pole-six-salient-pole structure, however, suffers from the following problems:

(1) In the winding state shown in FIG. 8A, there are crossover wire lengths exceeding the distance between adjoining salient poles ($\pi/3$) such as the crossover wire a1 from the riser R1 to the riser R4 and the crossover wire a2 from the salient pole P1 to the salient pole P2. Further, there are cross points of the crossover wires between different phase coils near the risers such as the cross point between the crossover wire a3 from the riser R4 to the salient pole P1 and the crossover wire a4 from the riser R3 to the riser R6, so disconnection or a short-circuit is liable to occur. In this winding state, if the order of the winding direction of the first phase coil is applied to the second phase coil, the wire should be knotted with the riser R6 and wrapped around the adjoining salient pole P2 in the reverse rotation direction, but in actuality part of the order of winding direction of the first phase coil is broken and the wire is knotted with the riser R6 and wrapped around the adjoining salient pole P3 in the forward rotation direction. The breakage in the order occurs in the third phase coil as well, and there is a cross point of the crossover wires near the riser R4 of the winding end E.

(2) In the winding state shown in FIG. 8A, there are crossover wire lengths exceeding the distance between adjoining salient poles ($\pi/3$) such as the crossover wire a1 from the riser R1 to the riser R4 and the crossover wire a2 from the salient pole P1 to the salient pole P2. Further, there are cross points of the crossover wires between different phase coils near the risers such as the cross point between the crossover wire a3 from the riser R4 to the salient pole P1 and the crossover wire a4 from the riser R3 to the riser R6, so disconnection or a short-circuit is liable to occur. In this winding state, if the order of the winding direction of the first phase coil is applied as it is to the second phase coil and the third phase coil, the winding directions of the crossover wires between the risers and between the salient poles are uniformly the forward rotation direction from the winding start S to the winding end E, so the total length of the crossover wires becomes rather long. If the winding order is uniformly used in the coils of all phases, cross points will occur between the crossover wire a1 and the crossover wire a5 of the riser R6 from the salient pole P1.

(3) In the winding state shown in FIG. 8C, the winding order is made uniform for the coils of all of the phases, but the winding directions between the risers and the winding directions between the salient poles are opposite to each other. There are no cross points between crossover wires of different phase coils. For example, the crossover wire a3 from the riser R4 to the salient pole P1 and the crossover wire a4 from the riser R3 to the riser R6 do not cross. The reason is that the crossover wire a4 is not passed between the salient poles P6 and P1, but is made to bypass them by attachment to the salient pole P4. However, there are cross points of crossover wires near the risers between same phase coils. Further, for example, there are lengths of crossover wires exceeding the distance ($\pi/3$) between adjoining salient poles and disconnection is liable to occur such as at the crossover wire a1 from the riser R1 to the salient pole P3 or the crossover wire a2 from the salient pole P1 to the salient pole P2.

In each of these winding states, it is necessary to attach the wire at the adjoining salient pole P3 or salient pole P5 serving as a loose stopper immediately before winding around the salient pole P2. Further, because the coil at the salient pole P1 and the coil at the salient pole P2 have the same winding direction, it is not possible to wind the wire around the salient poles between them alternately at the crossover wire a2 from the salient pole P1 to the salient pole P2, resulting in lengths of crossover wires exceeding the distance ($\pi/3$) between adjoining salient poles. Further, because there are cross points of the crossover wires near the risers, the conductive wires will abrade due to rubbing as a result of vibration or the thermal cycle while driving the motor and disconnection accidents are liable to occur.

SUMMARY OF THE INVENTION

An object of the present invention is to provide a small brush motor which uses as an overvoltage suppressing varistor a three-electrode ring varistor as generally used in an armature of a two-magnetic-pole-three-salient pole structure and which improves the winding state of the coils so as to suppress occurrence of disconnection or short-circuits of crossover wires.

To attain the above object, there is provided a small brush motor comprised of an armature core having six salient poles in a radial array, a commutator having six risers positioned between the salient poles at one end face side of the armature core, a three-phase coil knotted with the six risers and wrapped around the salient poles, an overvoltage suppressing varistor connected to the risers, a brush in sliding contact with the commutator, and an outer permanent magnet having four magnetic poles, each phase coil of the three-phase coil being attached using three risers and two salient poles.

Here, assume the side opposite to the one end face side of the armature core is "the other end face side". Further, assume the risers in a point symmetric positional relationship about the center of rotation of the armature core among the six risers are referred to as first risers and second risers, respectively. The first risers are not connected to the electrodes of the overvoltage suppressing varistor. The second risers are connected to the electrodes of the overvoltage suppressing varistor. Still further, assume the salient poles adjoining each other in the forward rotation direction and reverse rotation direction among the six salient poles are referred to as first salient poles and second salient poles, respectively. That is, in the present invention, each phase coil has a zigzag part, a first coil part and a second coil part. The zigzag part is formed by alternately bending and connecting the three salient poles in the interval from the knotting part (wrapped part) of the first riser in the forward rotation direction to the knotting part of the second riser successively to the other end face side, the one end face side, and the other end face side. The first coil part is formed by winding from the knotting part of the second riser in the reverse rotation direction and wrapping around the adjoining first salient pole. The second coil part is formed by winding from the first coil part in the forward rotation direction and wrapping at the adjoining second salient pole and winds from the first coil part in the forward rotation direction and connects to the first riser of an adjoining different phase. The winding directions of the first coil part and the second coil part are opposite winding directions from each other.

Because the first coil part and the second coil part of the same phase coil are formed wound oppositely at the adjoining first and second salient poles, the interval from the knotting part of the first riser in the forward rotation direction to the knotting part of the second riser can be formed as a zigzag part successively alternately bending the three salient poles to the other end face side, the one end face side, and the other end face side. Further, the first coil part can be wrapped from the knotting part of the second riser adjoining it and can be knotted with the opposite phase first riser adjoining it from the second coil part, so the total length of all crossover wires in the coil can be kept to not more than the distance ($\pi/3$) between salient poles and occurrence of disconnection can be suppressed. Further, it is, possible to eliminate the cross points of crossover wires connecting the knotting part of the riser and coil part of the salient pole between different phase coils, so when soldering or otherwise fixing the knotting parts of the risers, even if the heat of melting is conducted to the crossover wires, because there are no cross points of the crossover wires between different phase coils, it is possible to prevent destruction of the insulation film of the crossover wires, possible to prevent short-circuits between different phase coils, and reduce the size and improve the yield of the motors. Further, the total length of the crossover wires serving as relay wires can be shortened, so the copper loss can be suppressed.

In the same phase coil, while there are cross points between the two crossover wires for the knotting parts of the risers (knotting start wire and knotting end wire) and peeling of the insulating film may occur and short-circuits arise due to the heat of melting at the time of manufacture without problem, the uncovered conductive wires are liable to abrade and disconnection accidents occur at the cross points due to vibration occurring during motor operation. The point is even more important when the wires are ultrafine wires.

Therefore, preferably the winding directions of the knotting part of the second riser and the first coil part are the same direction and the winding directions of the second coil part and the knotting part of the first riser of the different phase are the same direction. According to this winding state, the two crossover wires are bent outward, so no cross point is generated, the occurrence of disconnection accidents is suppressed, and a high reliability motor can be provided.

Note that the coil may be made one comprised of a plurality of ultrafine wires arranged in parallel or a single ultrafine wire.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
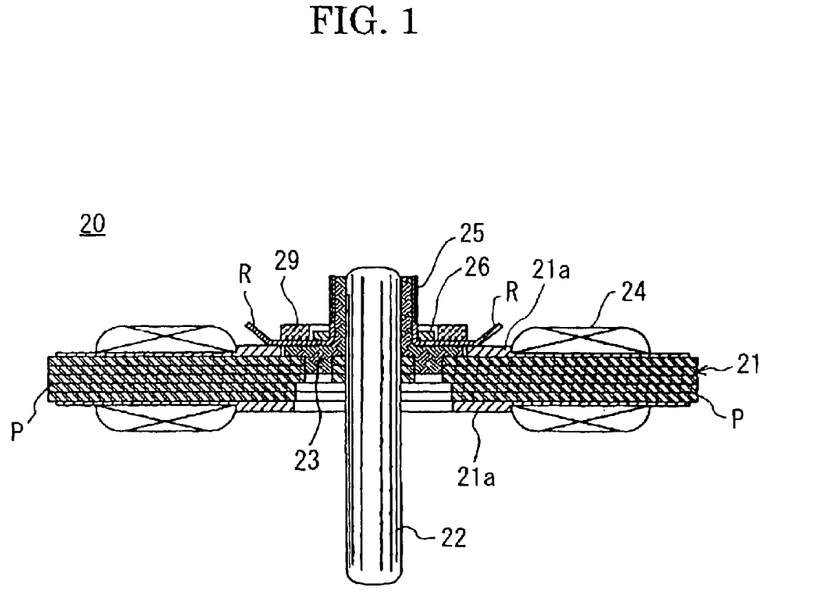
FIG. 1 is a front view showing an armature in a small brush motor according to an embodiment of the present invention.
Figure 2:
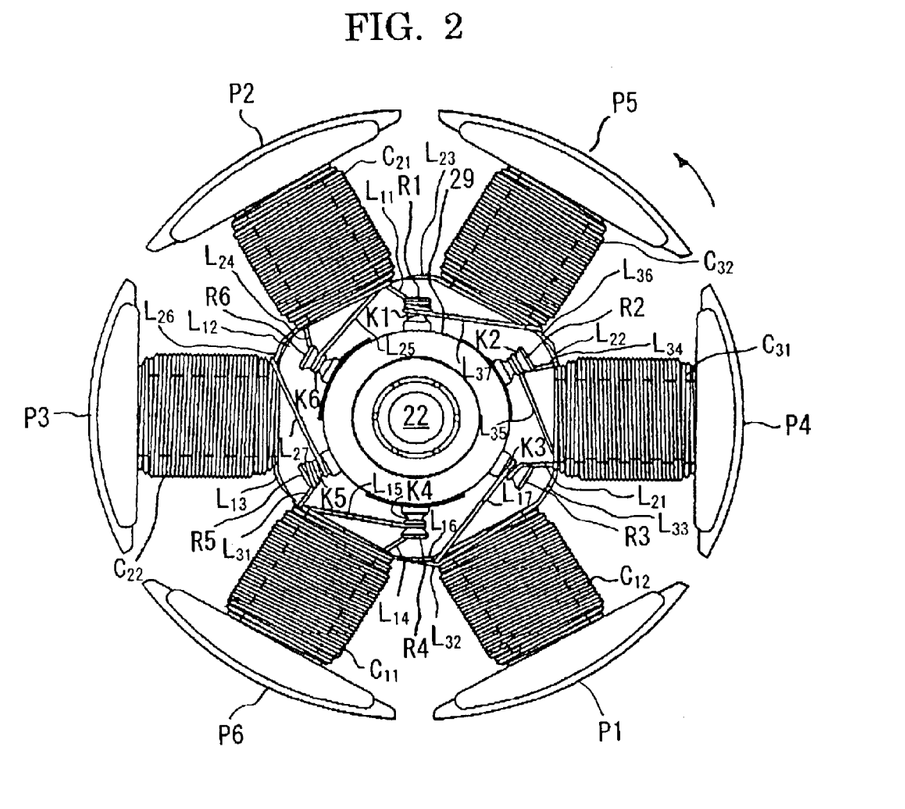
FIG. 2 is a plan view of the armature.
Figure 3:
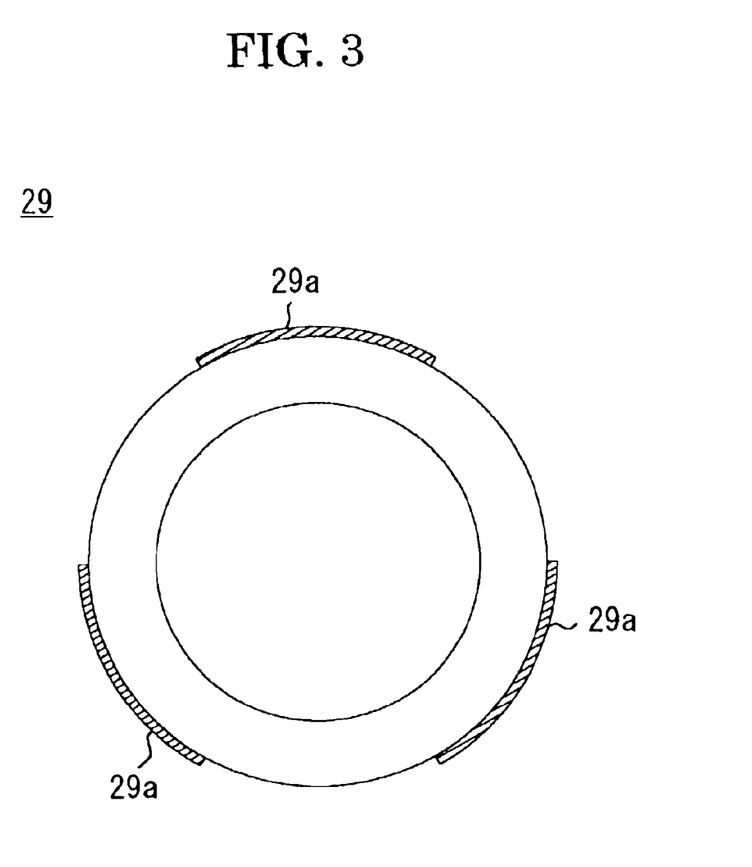
FIG. 3 is a plan view of a three-electrode ring varistor used for the armature.
Figure 4:
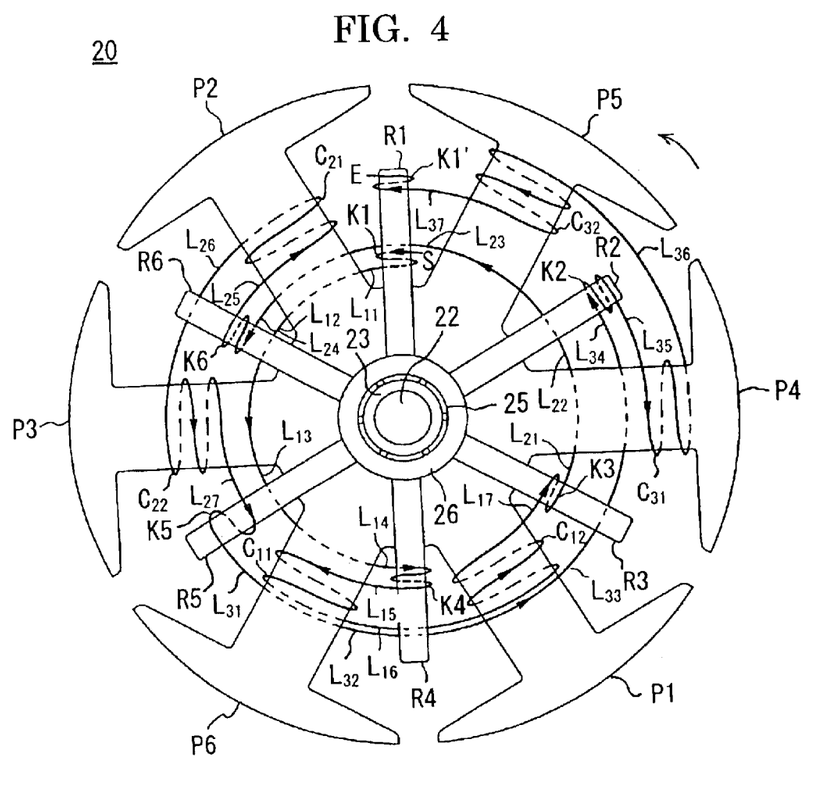
FIG. 4 is a schematic plan view of a winding state of a coil in the state with the varistor removed in the armature.
Figure 5:
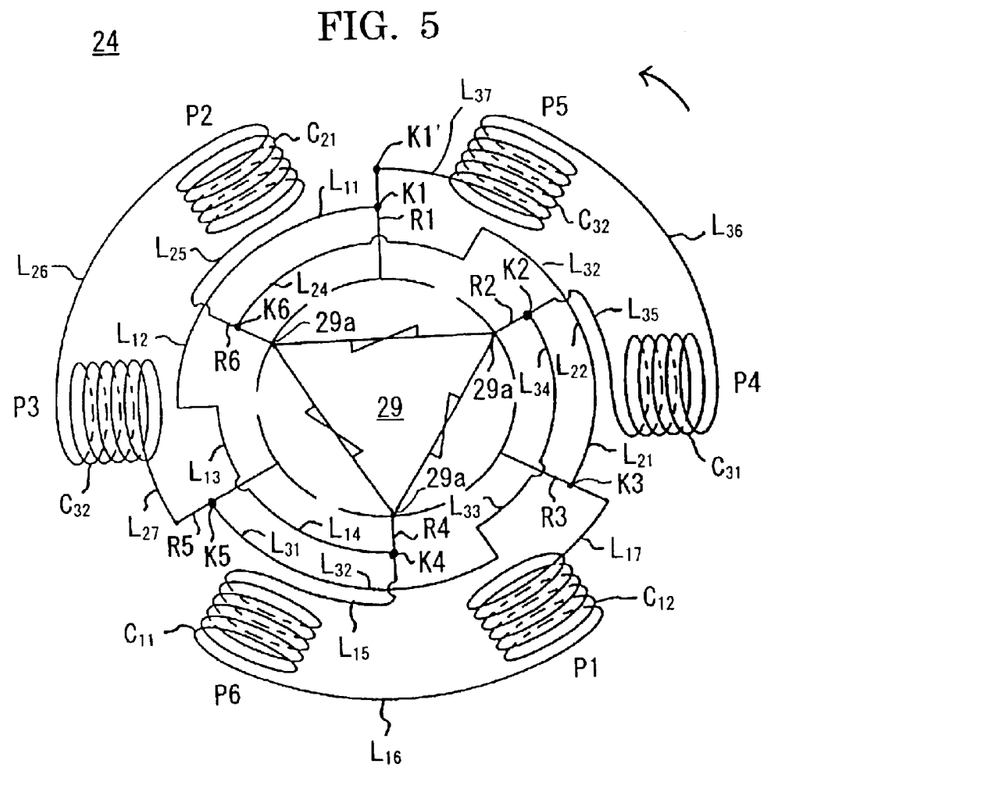
FIG. 5 is a wiring diagram of the coil.
Figure 6:
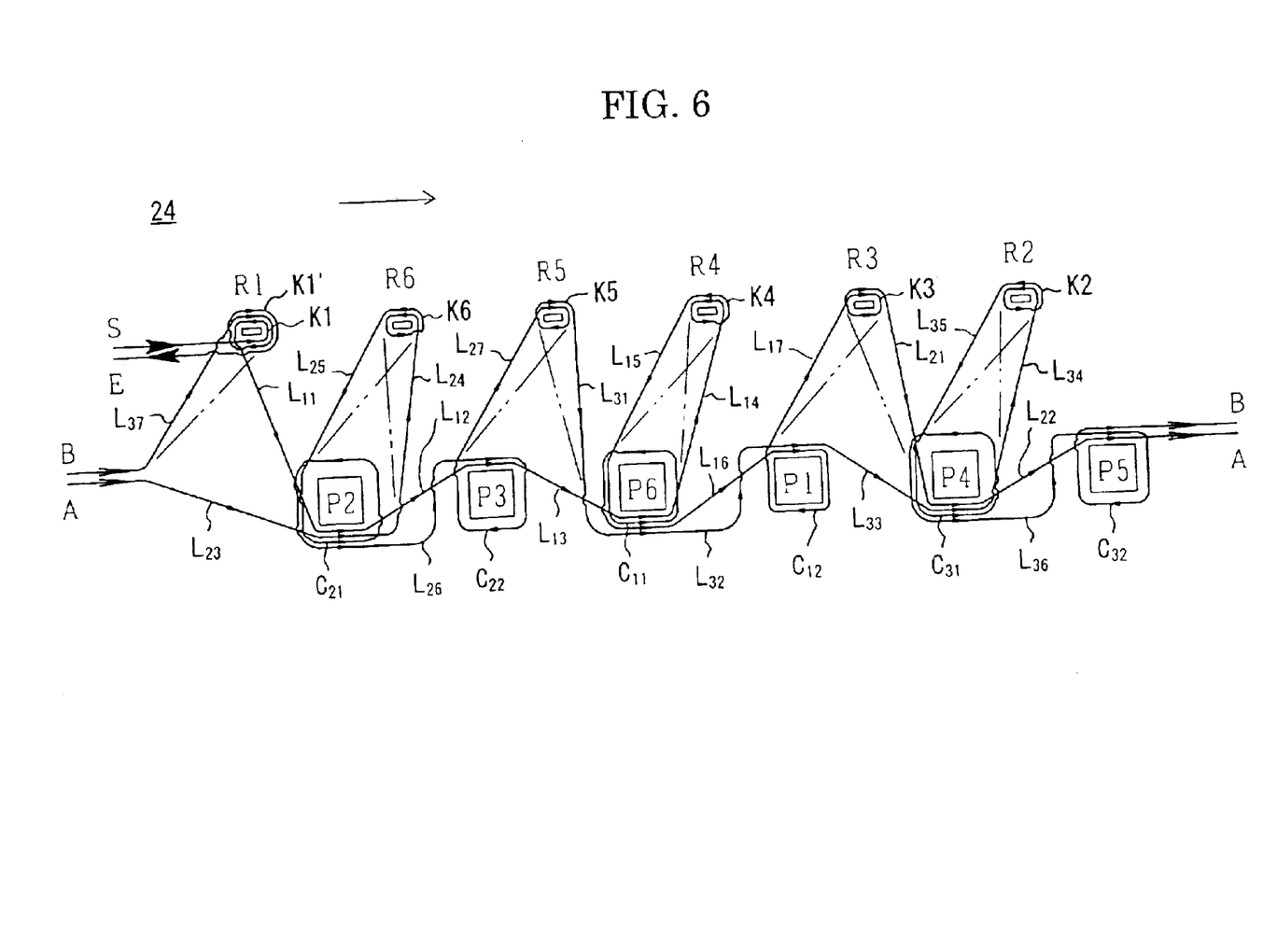
FIG. 6 is a diagram showing the winding state of the coil along the peripheral face of the armature coil.

Preferred embodiments of the present invention will be described in detail below while referring to the attached figures. FIG. 1 is a front view showing an armature in a small brush motor according to an embodiment of the present invention; FIG. 2 is a plan view of the armature; FIG. 3 is a plan view of a three-electrode ring varistor used for the armature; FIG. 4 is a schematic plan view of a winding state of a coil in the state with the varistor removed in the armature; FIG. 5 is a wiring diagram of the coil; and FIG. 6 is a diagram showing the winding state of the coil along the peripheral face of the armature core.

The small brush motor of the present embodiment is provided with an armature 20 serving as an inner rotor and a permanent magnet (not shown) having four magnetic poles (N pole, S pole, N pole, and S pole) serving as an outer stator. In the armature 20, an armature core (stacked core) 21 obtained by stacking, punching, and press-forming a plurality of magnetic sheets is attached to a shaft 22. This armature core 21 has six salient poles P (P1 to P6) in a radial array and is covered on its surface with an insulating resin or insulating coating film 21a. The shaft 12 has a commutator holder 23 made of an insulating resin press-fit over it. A commutator 25 is press-fit around the commutator holder 23. The commutator 25 is prevented from detachment by a washer 26 serving as a stop ring. The commutator 25 is comprised of six commutator pieces. Each commutator piece has one riser (end part) R in its radial direction. The six risers R (R1 to R6) are positioned between salient poles at the front side of the armature core 21. The commutator 25 is in sliding contact with a brush (not shown). Further, at the outer periphery of the washer 26 over the six risers R (R1 to R6) is attached a ring varistor 29 for suppressing overvoltage. The ring varistor 29 has three electrodes 29a at equal intervals on its peripheral face. The three electrodes 29a are connected in a conductive manner to the risers R2, R4, and R6 by soldering. The six risers R1 to R6 and the six salient poles P1 to P6 have an ultrafine or fine coil 27 wound around them in a continuous pattern. As shown in FIG. 5, a three-phase coil 24 of delta-connections is formed. Each phase coil is formed using three risers (one for it exclusively and two shared) and two salient poles. It is also possible to use a plurality of ultrafine wires arranged in parallel as the coil.

Here, in explaining the winding state of the three-phase coil 24, the riser side of the armature core 21 will be called the "front side (top view side)", while the opposite side will be called the "back side (bottom view side)". Each phase coil has a zigzag part, a first coil part ($C_{11}$, $C_{21}$, $C_{31}$) and a second coil part ($C_{12}$, $C_{22}$, $C_{32}$). The zigzag part is formed by alternately bending and connecting successively to the back side, front side, and back side the three salient poles extending from the knotting part (K1, K3, K5) of the first riser (R1, R3, R5) in the forward rotation direction (arrow direction in FIG. 2 to FIG. 6) to the knotting part (K4, K6, K2) of the second riser (R4, R6, R2). The first coil part ($C_{11}$, $C_{21}$, $C_{31}$) is formed by winding from the knotting part (K4, K6, K2) of the second riser (R4, R6, R2) in the reverse rotation direction and wrapping at the adjoining first salient pole (P6, P2, P4). The second coil part ($C_{12}$, $C_{22}$, $C_{32}$) is formed by winding from the first coil part ($C_{11}$, $C_{21}$, $C_{31}$) in the forward rotation direction and wrapping at the adjoining second salient pole (P1, P3, P5). Each phase coil is wound from the second coil part ($C_{12}$, $C_{22}$, $C_{32}$) in the forward rotation direction and is connected to a knotting part (K3, K5, K1) of the adjoining opposite phase first riser (R3, R5, R1). The winding directions of the first coil part ($C_{11}$, $C_{21}$, $C_{31}$) and the second coil part ($C_{12}$, $C_{22}$, $C_{32}$) are opposite each other.

Here, if expressing the forward rotation direction by the arrow mark →, the reverse direction rotation by the arrow mark ⇒, and the length of the crossover wire between the salient poles, between the risers, and between a salient pole and a riser by rotational angle (radians) as a general measure and showing the winding order by simple symbols, the winding direction, as shown next, is mainly in the forward direction. Only the crossover wires from the second risers R4, R6, and R2 to the adjoining salient poles P6, P2, and P4 are in the reverse direction.

$R1(S) \to (\pi) \to R4 \Rightarrow (\pi/6) \Rightarrow P6 \to (\pi/3) \to P1 \to (\pi/6) \to R3 \to (\pi) \to$
$R6 \Rightarrow (\pi/6) \Rightarrow P2 \to (\pi/6) \to P3 \to (\pi/6)(\pi/6) \to R5 \to (\pi) \to$
$R2 \Rightarrow (\pi/6) \Rightarrow P4 \to (\pi/6) \to P5 \to (\pi/6) \to R1(E)$ That is, the zigzag part in the first phase coil is formed by attachment from the knotting part K1 of the riser R1 through the forward rotation direction crossover wire $L_{11}$ to the back side of the salient pole P2, attachment through the forward rotation direction crossover wire $L_{12}$ to the front side of the salient pole P3, and attachment through the forward rotation direction crossover wire $L_{13}$ to the salient pole P3. Further, the first phase coil has a knotting part K4 connected through the forward rotation direction crossover wire $L_{13}$ to the riser R4 and a first coil part $C_{11}$ formed by attachment from there through the reverse rotation direction $L_{15}$ to the salient pole P6. Further, the first phase coil has a second coil part $C_{12}$ comprised from the first coil part $C_{11}$, through the forward rotation crossover wire $L_{16}$ to the adjoining salient pole P1 and is connected from there through the forward rotation direction crossover wire $L_{17}$ to the knotting part K3 of the riser R3. Further, the winding directions of the first coil part $C_{11}$ and the second coil part $C_{12}$ are in opposite directions from each other.

Further, the winding method of the second phase coil is the same as the winding method of the first phase coil. That is, the zigzag part of the second phase coil is formed by attachment from the knotting part K3 of the riser R3 through the forward rotation direction crossover wire $L_{21}$ to the back side of the salient pole P4, attachment through the forward rotation direction crossover wire $L_{22}$ to the front side of the salient pole P5, and attachment through the forward rotation direction crossover wire $L_{23}$ to the back side of the salient pole P2. Further, the second phase coil has a knotting part K6 connected through the forward rotation direction crossover wire $L_{24}$ to the riser R6 and first coil part $C_{21}$ formed by attachment from there through the reverse rotation direction $L_{25}$ to the salient pole P2. Further, the second coil has a second coil part $C_{22}$ formed by attachment from the first coil part $C_{21}$ through the forward rotation direction crossover wire $L_{26}$ to the adjoining salient pole P2 and is connected from there through the forward rotation direction crossover wire $L_{27}$ to the knotting part K5 of the riser R5. Further, the winding directions of the first coil part $C_{21}$ and second coil part $C_{22}$ are opposite each other.

Further, the winding method of the third phase coil is the same as the winding method of the first phase coil. That is, the zigzag part of the third phase coil is formed by attachment from the knotting part K5 of the riser R5 through the forward rotation direction crossover wire $L_{31}$ to the back side of the salient pole P6, attachment through the forward rotation direction crossover wire $L_{32}$ to the front side of the salient pole P4, and attachment through the forward rotation direction crossover wire $L_{33}$ to the back side of the salient pole P4. Further, the third phase coil has a knotting part K2 connected through the forward rotation direction crossover wire $L_{34}$ to the riser R2 and first coil part $C_{31}$ formed by attachment from there through the reverse rotation direction $L_{35}$ to the salient pole P4. Further, the third coil has a second coil part $C_{32}$ formed by attachment from the first coil part $C_{31}$ through the forward rotation direction crossover wire $L_{36}$ to the adjoining salient pole P4 and is connected from there through the forward rotation direction crossover wire $L_{37}$ to the knotting part K1 of the riser R1. Further, the winding directions of the first coil part $C_{31}$ and second coil part $C_{32}$ are opposite each other.

In this way, in the present embodiment, because the first coil part ($C_{11}$, $C_{21}$, $C_{31}$) and the second coil part ($C_{12}$, $C_{22}$, $C_{32}$) of the same phase coil are wound in opposite directions at the adjoining first salient pole (P6, P2, P4) and second salient pole (P1, P3, P5), the interval from the knotting part (K3, K5, K1) of the first riser (R3, R5, R1) in the forward rotation direction to the knotting part (K4, K6, K2) of the second riser (R4, R6, R2) can be formed as a zigzag part obtained by alternately bending the three salient poles to the other end face side, the one end face side, and the other end face side. Further, the first coil part ($C_{11}$, $C_{21}$, $C_{31}$) can be attached from the knotting part (K4, K6, K2) of the second riser (R4, R6, R2) adjoining it and can be connected to the different phase first riser (R3, R5, R1) adjoining it from the second coil part ($C_{12}$, $C_{22}$, $C_{32}$), so it is possible to suppress the total length of the crossover wires at the coil to not more than the distance ($\pi/3$) between salient poles and occurrence of disconnection can be suppressed. Further, it is possible to eliminate the cross points between the knotting parts of the risers and the coil parts of the salient poles between different phase coils, so when soldering or otherwise fixing knotting parts of the risers, even if the heat of melting is conducted to the crossover wires, because there are no cross points of the crossover wires between different phase coils, destruction of the insulating film of the crossover wires can be prevented, short-circuits between different phase coils can be suppressed, and the motor can be reduced in size and improved in yield. Further, because the total length of the crossover wires serving as the relay wires can be minimized, the copper loss can be suppressed.

Further, in the same phase coil as well, if there are cross points of the crossover wires as shown by the two-dot chain lines in FIG. 6, disconnection accidents are liable to occur due to vibration etc., but the winding directions of the knotting part (K4, K6, K2) of the second riser (R4, R6, R2) and the first coil part ($C_{11}$, $C_{21}$, $C_{31}$) are the same direction and the winding directions of the second coil part ($C_{12}$, $C_{22}$, $C_{32}$) and the knotting part (K3, K5, K1) of the different phase first riser (R3, R5, R1) are the same direction, so the two crossover wires connected to one riser are bent outward, so no cross points occur, the occurrence of disconnection accidents can be suppressed, and a highly reliable motor can be provided.

Note that a single ultrafine wire is used for the coil in the above embodiments, but it is also possible to use a coil comprised of a plurality of ultrafine wires arranged in parallel.

As explained above, the present invention has the following effects:

(1) Because the first coil part and the second coil part of the same phase coil are wound oppositely at the adjoining first and second salient poles, the interval from the knotting part of the first riser in the forward rotation direction to the knotting part of the second riser can be formed as a zigzag part obtained by successively alternately bending the three salient poles to the other end face side, the one end face side, and the other end face side. Further, the first coil part can be wound from the knotting part of the second riser adjoining it and can be connected to the opposite phase first riser adjoining it from the second coil part, so the total length of all crossover wires in the coils can be kept to not more than the distance ($\pi/3$) between salient poles and occurrence of disconnection can be suppressed. Further, it is possible to eliminate the cross points of crossover wires connecting the knotting parts of the risers and coil parts of the salient poles between different phase coils, so when soldering or otherwise fixing the knotting parts of the risers, even if the heat of melting is conducted to the crossover wires, because there are no cross points of the crossover wires between different phase coils, it is possible to prevent destruction of the insulation film of the crossover wires, possible to prevent short-circuits between different phase coils, and reduce the size and improve the yield of the motors. Further, the total length of the crossover wires serving as relay wires can be shortened, so the copper loss can be suppressed.

(2) The winding directions of the knotting part of the second riser and the first coil part are preferably the same direction and the winding directions of the second coil part and the knotting part of the different phase first riser are preferably the same direction. According to this winding state, the two crossover wires are bent outward, so no cross points occur, occurrence of disconnection accidents is prevented, and a high reliability motor can be provided.

While the present invention has been described with reference to specific embodiments chosen for purpose of illustration, it should be apparent that numerous modifications could be made thereto by those skilled in the art without departing from the basic concept and scope of the invention.

What is claimed is:

1. A small brush motor comprising:

an armature core having six salient poles in a radial array, a commutator having six risers positioned between the salient poles at one end face side of said armature core, a three-phase coil connected to the six risers and wound around the salient poles, an overvoltage suppressing varistor having three electrodes connected to every other of said six risers, a brush in sliding contact with said commutator, and an outer permanent magnet having four magnetic poles, each of the phase coil of said three-phase coil being wound using three risers and two salient poles, wherein said six risers comprise first risers and second risers, said first risers and said second risers being in a point symmetric positional relationship about the center of rotation of said armature core, said first risers not being connected to an electrode of said overvoltage suppressing varistor, and said second risers being connected to electrodes of said overvoltage suppressing varistor, wherein said six salient poles comprise first salient poles and second salient poles, said first salient poles adjoining said second risers in the forward rotation direction, and said second salient poles adjoining said second risers in the reverse rotation direction, wherein a side opposite to said one end face side of said armature core is defined as the-other-end face side, wherein each phase coil has a zigzag part, a first coil part and a second coil part, wherein said zigzag part is formed by alternately bending and connecting successively to said the-other-end face side, said one end face side, and said the-other-end face side the three salient poles in the interval from the knotting part of the first riser in the forward rotation direction to the knotting part of the second riser, wherein said first coil part is formed by winding from the knotting part of the second riser in the reverse rotation direction and wrapping at the adjoining first salient pole, and wherein said second coil part is formed by winding from the first coil part in the forward rotation direction and wrapping at the adjoining second salient pole and connects from the second coil part in the forward rotation direction to the knotting part of the first riser of an adjoining different phase, the winding directions of the first coil part and the second coil part being opposite winding directions from each other.

2. The small brush motor as set forth in claim 1, wherein the winding directions of the knotting part of said second riser and said first coil part are the same and the winding directions of said second coil part and the knotting part of the said different phase first riser are the same.

3. The small brush motor as set forth in claim 1 or 2, using a coil comprised of a plurality of ultrafine wires arranged in parallel.

* * * * *